United States Patent
Stark

(10) Patent No.: US 11,278,972 B2
(45) Date of Patent: Mar. 22, 2022

(54) CUTTING INSERT AND TOOL FOR MACHINING A WORKPIECE

(71) Applicant: Hartmetall-Werkzeugfabrik Paul Horn GmbH, Tübingen (DE)

(72) Inventor: Christian Stark, Rottenburg (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 254 days.

(21) Appl. No.: 16/601,977

(22) Filed: Oct. 15, 2019

(65) Prior Publication Data

US 2020/0038973 A1 Feb. 6, 2020

Related U.S. Application Data

(63) Continuation of application No. PCT/EP2018/057891, filed on Mar. 28, 2018.

(30) Foreign Application Priority Data

Apr. 27, 2017 (DE) ..................... 10 2017 109 098.3

(51) Int. Cl.
*B23C 5/20* (2006.01)
*B23C 5/06* (2006.01)

(52) U.S. Cl.
CPC ............... *B23C 5/207* (2013.01); *B23C 5/06* (2013.01); *B23C 2200/0433* (2013.01); *B23C 2200/367* (2013.01); *B23C 2210/168* (2013.01)

(58) Field of Classification Search
CPC ...... B23B 2200/3681; B23B 2200/369; B23C 2200/0433; B23C 2200/081;
(Continued)

(56) References Cited

U.S. PATENT DOCUMENTS 4,294,566 A * 10/1981 Boone ................ B23B 27/1622
407/114
5,158,401 A 10/1992 Pawlik
(Continued)

FOREIGN PATENT DOCUMENTS

CN 101060952 A 10/2007
CN 101896302 A 11/2010
(Continued)

OTHER PUBLICATIONS

International Search Report for International Application No. PCT/EP2018/057891, dated Jun. 26, 2018.
(Continued)

*Primary Examiner* — Nicole N Ramos
(74) *Attorney, Agent, or Firm* — Jason H. Vick; Sheridan Ross, PC

(57) ABSTRACT

A cutting insert (10) for a tool (100) for machining a workpiece. The cutting insert (10) is a four-bladed cutting insert which is in the form substantially of a rhomboid. The cutting insert (10) has two identical, oppositely arranged base sides (14a, 14b) and four identical main sides (16a-16d) which extend between the two base sides (14a, 14b). Each of the four main sides (16a-16d) comprises a rectilinear main cutting edge (12a-12d) and a rectilinear secondary cutting edge (26a-26d) which is arranged transversely thereto. The main and secondary cutting edges (12a-12d) and (26a-26d) of each main side (16a-16d) lie in each case in a common cutting plane which is aligned parallel to a contact surface (28a-28d) which is also provided on the main sides (16a-16d).

13 Claims, 4 Drawing Sheets

(58) Field of Classification Search
CPC ........ B23C 2200/085; B23C 2200/365; B23C 2200/367; B23C 2210/082; B23C 2210/168; B23C 5/06; B23C 5/207
See application file for complete search history.

(56) References Cited

U.S. PATENT DOCUMENTS

| | | | |
|---|---|---|---|
| 7,077,605 B2 | 7/2006 | Satran et al. | |
| 7,909,544 B2 | 3/2011 | Jansson | |
| 8,454,277 B2 | 6/2013 | Dudzinsky et al. | |
| 8,454,278 B2 | 6/2013 | Hartlohner et al. | |
| 8,702,353 B2 | 4/2014 | Chen et al. | |
| 8,882,407 B2 | 11/2014 | Agic | |
| 9,073,126 B2* | 7/2015 | Bhagath | B23C 5/02 |
| 9,168,590 B2 | 10/2015 | Kaufmann et al. | |
| 9,656,333 B2 | 5/2017 | Stark | |
| 9,662,722 B2 | 5/2017 | Stark | |
| 2007/0292219 A1 | 12/2007 | Craig | |
| 2008/0044241 A1* | 2/2008 | Koskinen | B23C 5/06 407/103 |
| 2008/0226403 A1* | 9/2008 | Craig | B23C 5/207 407/113 |
| 2008/0273931 A1* | 11/2008 | Spitzenberger | B23C 5/207 407/51 |
| 2009/0155004 A1 | 6/2009 | Jansson | |
| 2009/0155005 A1* | 6/2009 | Jansson | B23C 5/202 407/114 |
| 2010/0119313 A1* | 5/2010 | Hartlohner | B23B 27/1618 407/103 |
| 2011/0020080 A1* | 1/2011 | Zettler | B23C 5/207 407/113 |
| 2011/0052337 A1 | 3/2011 | Dudzinsky et al. | |
| 2012/0027530 A1 | 2/2012 | Agic | |
| 2014/0064864 A1 | 3/2014 | Kaufmann et al. | |
| 2015/0183032 A1 | 7/2015 | Stark | |
| 2015/0183034 A1 | 7/2015 | Stark | |
| 2017/0144235 A1* | 5/2017 | Dagan | B23C 5/06 |

FOREIGN PATENT DOCUMENTS

| | | | |
|---|---|---|---|
| CN | 102528143 A | 7/2012 | |
| CN | 103025463 A | 4/2013 | |
| CN | 103658797 A | 3/2014 | |
| CN | 104640659 A | 5/2015 | |
| CN | 104768687 A | 7/2015 | |
| DE | 102007022536 A1 | 11/2008 | |
| DE | 102012108752 B3 | 1/2014 | |
| DE | 102012017024 A1 | 3/2014 | |
| DE | 102012108751 A1 | 3/2014 | |
| EP | 0104517 A2 | 4/1984 | |
| EP | 1572407 B1 | 1/2007 | |
| JP | 2008-229744 A | 10/2008 | |
| RU | 2350432 C1 | 3/2009 | |
| RU | 2579867 C2 | 4/2016 | |
| SU | 1423291 A1 | 9/1998 | |

OTHER PUBLICATIONS

Written Opinion for international Application No. PCT/EP2018/057891, dated Jun. 26, 2018.
German Office Action for corresponding German Patent Application No. 10 2017 109 098.3, dated Dec. 15, 2017.
Examination Report for Russian Patent Application No. 2019125811/05(050618), dated Jun. 2, 2020.
International Preliminary Report on Patentability for International Application No. PCT/EP2018/057891, dated Nov. 7, 2019.
Chinese Office Action (Including Machine Translation) for Chinese Application No. 201880015011.3, dated Mar. 20, 2020.

* cited by examiner

CUTTING INSERT AND TOOL FOR MACHINING A WORKPIECE

CROSS REFERENCE TO RELATED APPLICATIONS

This application is a continuation of international patent application PCT/EP2018/057891, filed on Mar. 28, 2018 designating the U.S., which international patent application has been published in German language and claims priority from German patent application DE 10 2017 109 098.3, filed on Apr. 27, 2017. The entire contents of these priority applications are incorporated herein by reference.

BACKGROUND OF THE INVENTION

This disclosure relates to a cutting insert, in particular a tangential cutting insert, for a tool for machining a workpiece. This disclosure furthermore relates to a tool for machining a workpiece, in particular for tangential milling, having a tool holder which comprises at least one cutting insert receptacle in which a cutting insert according to this disclosure is releasably fastened.

The herein presented cutting insert comprises, in particular, the following features: (i) two substantially identical parts, namely a first part and a second part; (ii) a through-bore which runs through both parts along a bore axis; (iii) two substantially identical, oppositely arranged base sides, namely a first base side which is part of the first part and comprises a first planar support surface which runs orthogonally to the bore axis, and a second base side which is part of the second part and comprises a second planar support surface which runs orthogonally to the bore axis; (iv) four substantially identical main sides which extend between the two base sides, wherein each of the four main sides comprises a planar contact surface which runs orthogonally to the first and the second support surface; (v) four rectilinear main cutting edges, wherein one of the four main cutting edges is arranged on each of the four main sides, respectively, and each of the two parts each comprises two of the four main cutting edges, respectively, wherein the two main cutting edges of the first part run parallel to one another, and wherein the two main cutting edges of the second part run parallel to one another and at an acute angle to the main cutting edges of the first part; (vi) four rectilinear secondary cutting edges, wherein one of the four secondary cutting edges is arranged on each of the four main sides, respectively, and each of the two parts comprises two of the four secondary cutting edges, respectively, and wherein the secondary cutting edges run transversely to the main cutting edges. The two parts are connected together along a center plane which runs orthogonally to the bore axis and at an identical distance from the first support surface and the second support surface, respectively, wherein the first part can be projected onto the second part as a result of rotation by 180° about a rotational axis lying in the center plane and a subsequent rotation by the acute angle about the bore axis. Each of the four main cutting edges is connected at a first end to one of the four secondary cutting edges, which is arranged on the respective same main side, via a first corner edge, which comprises a radius and/or a chamfer.

An exemplary cutting insert of similar type is disclosed in DE 10 2012 108 752 B3.

Cutting inserts of the present type, which are generally also designated as indexable inserts or especially as tangential cutting inserts, are used for the most part in applications for metalworking, in particular in milling and turning applications. The present cutting inserts are used predominantly for tangential milling. Milling tools where such cutting inserts are used typically include a rotationally symmetrical tool holder on which at least one cutting insert, mostly however a plurality of said cutting inserts, are releasably fastened circumferentially.

The removal of material from the workpiece during the milling operation is ensured by high-precision cutters or cutting edges which are formed into the cutting inserts. In order to keep the wear as low as possible, to withstand the very high cutting forces which arise during processing and to ensure as high a level of precision as possible, said cutting inserts are produced for the most part from hard metal. The cutting edges nevertheless wear over time as a result of the high level of material stress. In particular in the case of milling operations which presuppose a high level of precision, the cutting inserts have consequently to be replaced after a certain time.

In order to prevent the relatively expensive cutting inserts having to be replaced entirely each time the blades are worn, multi-sided cutting inserts have been developed which comprise multiple blades arranged symmetrically to one another. Such an indexable insert with four identical main cutting edges arranged symmetrically to one another is disclosed, for example, in EP 1 572 407 B1.

The indexable insert shown therein is realized rotationally symmetrically about 180° with reference to its three main axes, respectively. As soon as the main cutting edge used is worn, the indexable insert can consequently be rotated and/or turned by 180° and fastened in the tool holder in the new position. When one of the four main cutting edges is worn, the indexable insert consequently does not have to be replaced entirely but only rotated or turned in the holder so that the processing is able to be continued with the up to now unused, non-worn main cutting edges.

On account of the symmetry characteristics of the indexable insert where each main cutting edge comprises the identical cutting geometry, the cutting characteristics are not changed as a result of turning or rotating the indexable insert. In other words, one and the same indexable insert can consequently be used four times until all the cutting edges are worn and the indexable insert has to be disposed of. This is also the case with the indexable insert disclosed in DE 10 2012 108 752 B3. However, the four main cutting edges here are not distributed on two sides of the indexable insert as according to EP 1 572 407 B1 but on four sides so that one main cutting edge in each case is provided per main side.

DE 10 2007 022 536 A1 and JP 2008-229744 A disclose rotatable and turnable eight-bladed cutting inserts with a substantially square-shaped base area.

In contrast to simple, non-turnable cutting inserts or cutting plates, such indexable inserts provide a considerably higher level of flexibility and, by being able to be used several times, can be used for considerably longer without this being accompanied by losses in processing precision. Although such four-bladed indexable inserts are clearly more complex in production than conventional single-bladed (non-turnable) cutting inserts, they prove to be not only handier but also, when viewed overall, more cost-efficient for the consumer.

From a point of view of the manufacturer of such indexable inserts, there is a structural problem, however, not only in realizing the symmetry characteristics of such indexable inserts with several identical cutting edges but also at the same time in ensuring that each of said cutting edges comprises identical processing characteristics and as a result is able to be used in an identical manner. The greatest problem, in this case, is often avoiding possible collisions with other components of the cutting insert or of the tool holder and ensuring a secure seat for the cutting insert in the tool receptacle of the tool holder so that optimum force introduction is ensured.

In particular, care must be taken to ensure that the cutting edges not used at the respective time or remaining components of the cutting insert do not collide in an unwanted manner with the workpiece. Therefore, places of the cutting insert which are not used for the machining of the workpiece must not collide with the workpiece. In other words, care must therefore be taken to ensure that the cutting edges not used at the respective time run freely. It appears obvious that such prerequisites are more difficult to realize in the case of indexable inserts with multiple, alternately usable cutting edges than is the case with conventional cutting inserts with only one cutting edge.

The above-mentioned symmetry characteristics, the free running of the remaining cutting edges and the avoiding of unwanted collisions between the cutting insert and the workpiece is achieved in the case of the indexable insert disclosed in EP 1 572 407 B1 as a result of the indexable insert comprising two parts which are rotated by a predefined angle in relation to one another about a main axis of the indexable insert. The main cutting edges, in this case, are each rotated by a predefined angle in relation to one another. In this way, the required symmetry and free running characteristics can be ensured in a technically sustained manner. Then again, a relatively large number of complexly formed surfaces are created in the case of such an indexable insert that is rotated in on itself. Relatively complex chip surfaces which are technically very demanding to produce, are created in particular on the main insert surfaces by such a rotation. Such demanding production, even if it should be technically realizable, is linked with very high production costs. This results ultimately in the indexable inserts having high unit costs for the end consumer.

SUMMARY OF THE INVENTION

It is an object to provide a cutting insert of the type named in the introduction which provides an alternative to the indexable inserts disclosed in the prior art.

According to a first aspect, a cutting insert for a tool for machining a workpiece is presented, comprising:
two identical parts, namely a first part and a second part;
a through-bore which runs through both parts along a bore axis;
two identical, oppositely arranged base sides, namely a first base side which is part of the first part and comprises a first planar support surface (24a) which runs orthogonally to the bore axis, and a second base side which is part of the second part and comprises a second planar support surface which runs orthogonally to the bore axis;
four identical main sides which extend between the two base sides, wherein each of the four main sides comprises a planar contact surface which runs orthogonally to the first and the second support surface;
precisely four rectilinear main cutting edges, wherein precisely one of the four main cutting edges is arranged on each of the four main sides, respectively, and each of the two parts comprises two of the four main cutting edges, respectively, wherein the two main cutting edges of the first part run parallel to one another, and wherein the two main cutting edges of the second part run parallel to one another and at an acute angle to the main cutting edges of the first part;
four rectilinear secondary cutting edges, wherein one of the four secondary cutting edges is arranged on each of the four main sides, respectively, and each of the two parts comprises two of the four secondary cutting edges, respectively, and wherein the secondary cutting edges run transversely to the main cutting edges;
wherein the two parts are connected together along a center plane which runs orthogonally to the bore axis and at an identical distance from the first support surface and the second support surface, respectively, and wherein the first part can be projected onto the second part as a result of rotation by 180° about a rotational axis lying in the center plane and a subsequent rotation by the acute angle about the bore axis;
wherein each of the four main cutting edges is connected at a first end to one of the four secondary cutting edges, which is arranged on the respective same main side, via a first corner edge, which comprises a radius and/or a chamfer, and
wherein each of the four main cutting edges is arranged with the secondary cutting edge, arranged on the respective same main side, in a common cutting plane which is aligned parallel to the contact surface arranged on the respective same main side, wherein each of the contact surfaces is offset toward the central bore axis in relation to the cutting plane arranged on the respective same main side.

According to a second aspect, a tool for machining a workpiece is presented, having a tool holder which comprises at least one cutting insert receptacle in which a cutting insert of the aforementioned type is releasably fastened.

Similar to the cutting insert disclosed in DE 10 2012 108 752 B3, the herein presented cutting insert also comprises two substantially identical parts which are connected together integrally along a center plane.

The center plane is used in the present case simply for the geometric description of the cutting insert. However, in this case it is simply a conceived, imaginary auxiliary plane which is not present physically. The parts are described in the present case as "substantially identical". The addition of "substantially" is simply used because the overall geometry of the two parts of the cutting insert is certainly identical, but smaller details which have no direct influence on the machining, can deviate from the exact identity. The two parts preferably deviate from one another, if at all, only by markings or inscriptions which have no technical contribution. For example, the individual main sides of the cutting insert can be marked differently in order to number them consecutively.

Similar to the cutting insert disclosed in DE 10 2012 108 752 B3, the herein presented cutting insert is also rotationally symmetrical through 180° with reference to the bore axis.

A difference to the cutting insert disclosed in DE 10 2012 108 752 B3, however, is that on each of the four identical main sides of the cutting insert, the main cutting edge with the secondary cutting edge arranged on the same main side is arranged in a common cutting plane which runs parallel to the contact surface arranged in each case on the same main side. It is obvious that said cutting plane, similar to the above-named center plane, is a purely imaginary plane which is referred to in the present case purely for description purposes.

The named manner in which the main and secondary cutting edges are arranged in a common plane parallel to the respective contact surface, creates, firstly, a very precise type of alignment of the individual cutting edges relative to the respective contact surface which enables a simple and easily reproducible type of alignment of the main and secondary cutting edges with reference to the tool holder in which the cutting insert is clamped. Secondly, the named type of alignment creates a type of chip groove which is defined by the main and secondary cutting edges and the respectively associated contact surface. The contact surface consequently serves not only as part of the contact between the cutting insert and the tool holder but also at the same time as part of the chip groove, inside which the chip is able to form during machining.

In the region of the secondary cutting edge, the cutting insert therefore comprises a type of closed chip groove in contrast to the cutting insert disclosed in DE 10 2012 108 752 B3. This improves chip formation. It makes the removed chip better able to roll up, as a result of which chip breaking is supported and shorter chips are able to be generated. This has a positive effect on the surface quality of the workpiece to be processed. At the same time, however, it also reduces the load on the cutting edges, as a result of which longer service lives are possible. This, in turn, contributes to improved economic efficiency of the cutting insert.

The improved chip formation characteristics of the herein presented cutting insert take effect in particular (but not only) when the cutting insert is used for face-milling. When processing the workpiece by face-milling, the base of the geometry to be produced is usually processed namely with one of the secondary cutting edges of the cutting insert.

With reference to the terminology used in the present case, the following is noted: a "rectilinear" edge is to be understood in the present case as a straight-lined, that is to say non-curved edge. A "planar" surface is to be understood as a level, non-curved surface. "Transverse" is to be understood as a non-parallel alignment of two axes, edges or planes which encloses any angle not equal to 0°. "Transverse" thus can, though need not necessarily, mean perpendicular or orthogonal. An "edge" is to be understood in the present case as the transition between two planar surfaces which are aligned transversely to one another and can be angular but does not have to be. An edge can also be rounded. "Rotationally symmetrical through 180°" is to be understood as a body which is projected onto itself, in turn, at a rotation by 180° about a defined axis.

According to a refinement, each of the four main cutting edges is connected in each case at a second end to a side edge either directly or via a second corner edge which comprises a radius and/or a chamfer, wherein each of the four side edges is not arranged in the respective cutting plane in which the main cutting edge and secondary cutting edge of the same main side are arranged.

In other words, each main cutting edge is therefore connected at its first end to a secondary cutting edge via a first corner edge, which comprises a radius and/or a chamfer, and at its second, oppositely arranged end to a side edge either directly or via a second corner edge. The side edge, however, does not lie in the common cutting plane but runs out of the same. Said side edge does not usually come into contact with the workpiece to be processed when the cutting insert is used. This is therefore not a cutting edge with which the workpiece is machined. By the side edge running out of the cutting plane, a type of opening of the above-described chip groove is created on the side of the main cutting edge opposite the secondary cutting edge. Said opening enables an improved chip flow as the chips removed from the workpiece are able to flow away through said lateral opening.

A first end of each side edge is preferably connected either directly or via the corresponding second corner edge to the main cutting edge arranged on the same main side. An oppositely arranged second end of each side edge is connected directly, via a radius and/or via a chamfer to an edge of the contact surface arranged on the same main side, wherein the four contact surfaces are at a shorter distance from the bore axis than the four cutting planes.

At each main side of the cutting insert, the side edges consequently connect therefore in each case a lateral end of each main cutting edge to the contact surface arranged on the same main side. The side edges therefore run rearward away from the respective main cutting edge and consequently provide the above-named one-sided opening of the chip groove. The named side edges preferably form in each case an outside edge of the cutting insert so that the chip flowing away through the chip groove opening passes, as it were, directly into the atmosphere. The so-called positively-pulling cut preferably provided in the case of the herein presented cutting insert is additionally supported by said refinement. A positively pulling cut is referred to when the chip removal is effected over the chip surface in the direction away from the reducing material (also in the opposite direction to the slot wall created during processing). Such a positively pulling cut is advantageous with regard to the chip formation characteristics in contrast to the negatively pulling cut which runs in the opposite direction.

According to a further refinement, a planar chip surface is arranged between each main cutting edge and the contact surface arranged in each case on the same main side.

Said chip surface also supports the chip flow. A planar chip surface is additionally very simple to produce in particular compared to a curved or complexly formed chip surface.

According to a further refinement, an at least partially circumferential chamfer, which extends continuously along the second corner edge arranged on the respective main side, the main cutting edge, the first corner edge and the secondary cutting edge and abuts against the chip surface arranged on the same main side, is arranged on each main side.

The named chamfer forms a type of protective chamfer. The protective chamfer can be designed either as an angular or beveled chamfer or as a rounded radius.

According to a further refinement, the imaginary center plane intersects all four contact surfaces so that part of each contact surface is associated with the first part and another part of each contact surface is associated with the second part.

The contact surfaces are accordingly designed therefore to be relatively large, which makes it possible for the design of the insert seat in the tool to be of a simple type. This relatively large design of the contact surfaces also supports a simpler production of the cutting insert as the planar contact surfaces contribute to a simplification of the overall geometry also with regard to the necessary symmetry characteristics.

According to a further refinement, each of the four contact surfaces comprises two planar part surfaces, respectively, which are separated from one another by an indentation.

The two part surfaces of each contact surface are separated from one another preferably completely by the respective indentation. This enables a mechanically sturdy insert seat as the cutting insert abuts in a defined manner against the tool holder in the manner of a two-point or two-surface contact. Apart from this, inside the indentation it is possible to provide a marking by means of which the respective main side is numbered or characterized.

According to a further refinement, the cutting insert comprises on each main side two projections, respectively, on which the secondary cutting edges of the adjacent main sides are arranged, wherein the projections are arranged on oppositely arranged sides of the respective main side and protrude in relation to the contact surface of the respective main side.

Said projections are used in the herein presented the cutting insert for the purpose of creating on the secondary cutting edges free angles which are to ensure the necessary free running characteristics of the cutting insert. In other words, the free angles necessary for the running characteristics of the cutting insert required during processing are therefore formed in each case into the two projections. This occurs substantially as a result of each projection comprising planar and/or complexly formed surfaces which are inclined in relation to the adjacent contact surfaces and in relation to the adjacent secondary cutting edges so that in each case multiple free angles are created in the corners of the cutting insert. On account of the arrangement or forming of the free angles in said projections, the cutting insert does not have to be turned in on itself in an overly pronounced manner in order to avoid, effectively, a collision with the components of the cutting insert not used during processing. Apart from this, essentially less complexly formed surfaces, compared to this, are created as a result on the outer shell of the cutting insert, as is the case, for example, with the cutting insert disclosed in EP 1 572 407 B1. This makes production of the cutting insert simpler and consequently more cost-efficient.

According to a further refinement, the four secondary cutting edges run parallel to one another and orthogonally to the main cutting edges. This is advantageous in particular for tangential milling.

The cutting insert preferably comprises precisely four identical main cutting edges, wherein precisely one of the four main cutting edges is arranged on each main side. The cutting insert also comprises precisely four identical secondary cutting edges, wherein precisely one of the four secondary cutting edges is arranged on each main side. Each of the main sides is preferably designed in an asymmetrical manner. Each of the contact surfaces are also preferably designed in an asymmetrical manner. Nonetheless, the entire cutting insert meets the above-described symmetry characteristics, namely a rotational symmetry through 180° about the bore axis.

According to a further refinement, when viewed in plan view along the bore axis, the cutting insert has the form substantially of a rhomboid. A "rhomboid" is to be understood as a parallelogram which comprises four sides. The oppositely arranged sides of said parallelogram are parallel and of identical length, none of the four corners forming a right angle. The sum of all the corner angles, however, is 360°. Such a rhomboid has two diagonals which are of varying lengths and intersect obliquely, that is to say not at right angles. A rhomboid differs consequently to an equilateral diamond.

It shall be noted that, preferably, the cutting insert does not comprise precisely the form of a rhomboid in the described plan view. The cutting insert deviates from the ideal shape of a rhomboid in particular in the corners. This is due substantially to the corner edges and secondary cutting edges which have already been mentioned above and are arranged at the corners of the cutting insert.

The advantage substantially of the rhomboid shape of the cutting insert is that the required free running and symmetry characteristics can be realized in a favorable manner. Relatively few complexly formed surfaces which are difficult to produce are created as a result of the substantially rhomboid shape of the cutting insert. The four main insert sides (main sides) can consequently be designed in an identical manner. In addition, only few inclined or convex surfaces have to be formed into the cutting insert, which lowers the expenditure on processing considerably during production.

According to a further refinement, the main cutting edges are at smaller distance from the center plane than the support surfaces. As a result of said offset between the support surfaces and the main cutting edges, a substantially planar main free surface, which is inclined in relation to the imaginary center plane, that is to say does not run orthogonally to the central bore axis, is created in each case between the main cutting edges and the support surfaces. Said four planar main free surfaces are required, in turn, to ensure the necessary free running characteristics of the cutting insert as otherwise the support surfaces of the cutting insert could collide with the workpiece during processing. The angle of inclination, which the main free surfaces enclose with the adjacent support surface, is preferably within the range of 2-10°, more preferably within the range of 4-6°.

As already mentioned in the introduction, the present disclosure relates not only to the cutting insert itself but also to a tool for machining a workpiece, in particular for tangential milling, having a tool holder which comprises at least one cutting insert receptacle in which such a cutting insert is fastened. The above-named designs consequently also apply correspondingly with reference to the tool having such a cutting insert.

At this point it shall be noted that the use of the cutting insert is described in the present case predominantly with the example of a tangential milling tool. The herein presented cutting insert can also be used, in principle, however, equally in end-milling or in a rotatable tool holder. The cutting insert and also the claimed tool are consequently not restricted to the application described in this case.

It is obvious that the features named above and the features yet to be named below can be used not only in the respective specified combination but also in other combinations or on their own without departing from the spirit and scope of the present invention.

DESCRIPTION OF PREFERRED EMBODIMENTS

Figures 1, 2:
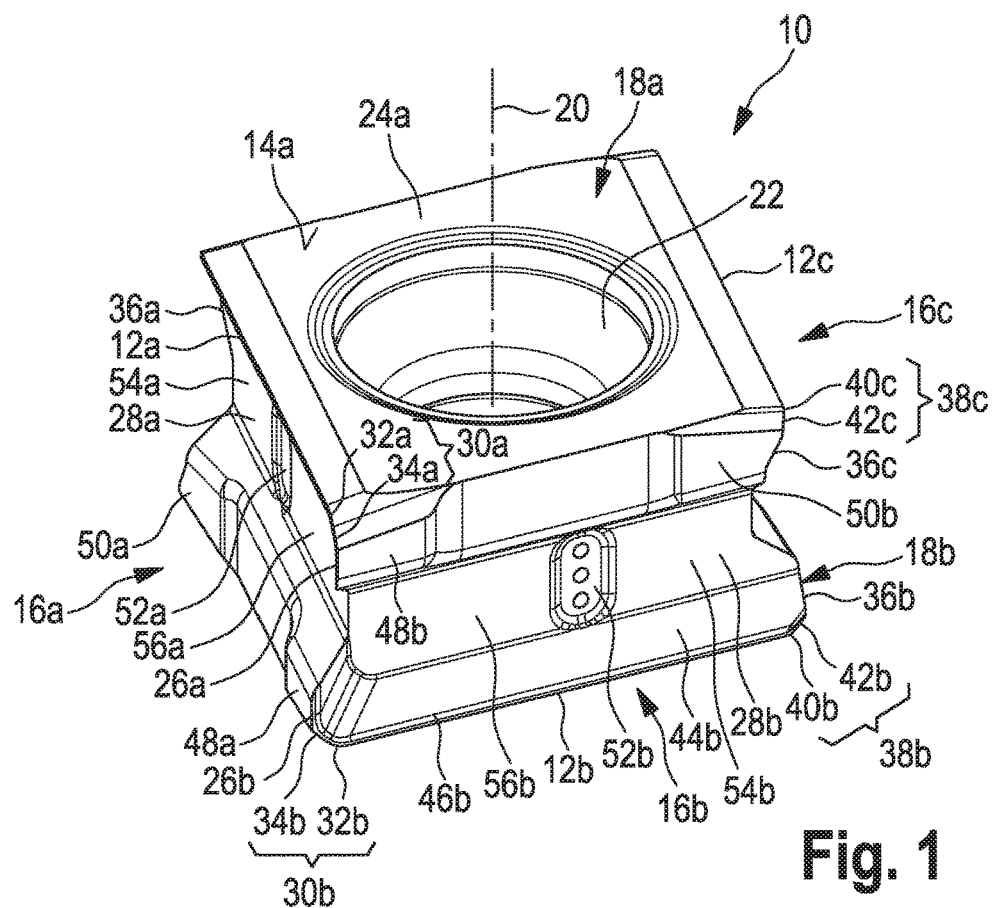
FIG. 1 shows a perspective view of an embodiment of the herein presented cutting insert as an example.
FIG. 2 shows a plan view from above of the embodiment shown in FIG. 1.

FIGS. 1-5 show various views of an embodiment of the cutting insert according to this disclosure as an example, the cutting insert being characterized in each case as a whole by the reference numeral 10. It can be seen from the perspective view shown in FIG. 1 that this is a four-bladed indexable insert 10, with four identical, rectilinear main cutting edges 12a-12d (main cutting edge 12d is hidden in FIG. 1, see for example FIG. 4 in this respect).

The outer form of the cutting insert 10 is delimited by a total of six sides: two oppositely arranged base sides 14a, 14b which form the top and bottom sides of the cutting insert 10, as well as four main sides 16a-16d which are also designated as main insert sides 16a-16d.

The two base sides 14a, 14b are designed identically to one another in the present exemplary embodiment. The four main sides 16a-16d are designed substantially identically to one another according to the present exemplary embodiment. They differ only by smaller markings which are used to identify the respective side. Otherwise they are designed simply as a mirror image of one another. A main cutting edge 12a-12d is arranged on each of the main sides 16a-16d.

Figure 3:
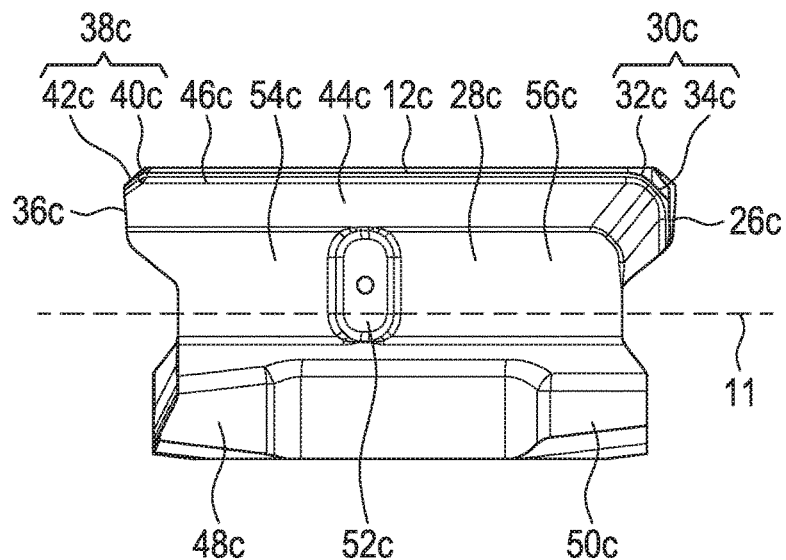
FIG. 3 shows a plan view from a first side concealed in FIG. 1 of the embodiment as an example.
Figure 4:
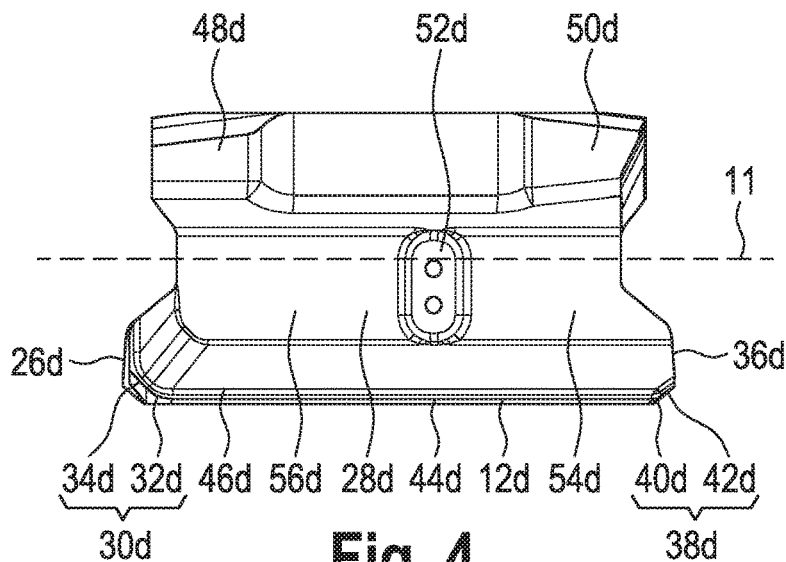
FIG. 4 shows a plan view from a second side concealed in FIG. 1 of the embodiment as an example.
Figure 5:
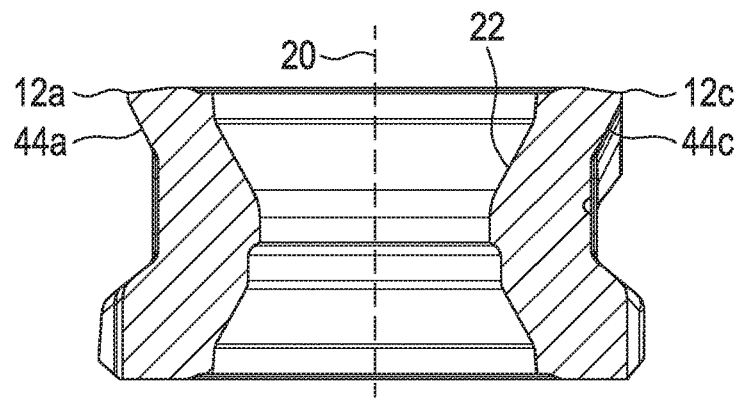
FIG. 5 shows a sectional view of the section indicated in FIG. 2.

The overall geometry of the cutting insert 10 can be additionally described in that said cutting insert comprises two identical parts 18a, 18b which are connected integrally with one another along an imaginary center plane 11 (see FIGS. 3 and 4). The divisions into the two parts 18a, 18b serves in the present case simply to simplify the description of the geometry of the cutting insert 10. Said division does not indicate, however, in this connection, that there are two distinct, that is to say separate, components.

The cutting insert 10 comprises a through-bore 22 which runs through both parts 18a, 18b along a bore axis 20. Said through-bore 22 serves for receiving a screw, by means of which the cutting insert 10 is fastened typically on a tool holder, as proceeds, as an example, from FIGS. 7 and 8.

The geometric context of the two parts 18a, 18b of the cutting insert 10 can be described as follows: The center plane 11, along which the two parts 18a, 18b are connected together, runs orthogonally to the bore axis 20 of the through-bore 22 and divides the cutting insert 10 into two equal-sized halves. The first part 18a can be projected onto the second part 18b as a result of rotation by 180° about a rotational axis lying in said center plane 11 and a subsequent rotation about the bore axis 20. The angle of the second imaginary rotation corresponds, in this case, to the angle which the main cutting edges 12a, 12c of the first part 18a enclose with the main cutting edges 12b, 12d of the second part 18b.

Two of the total of four main cutting edges 12a-12d are arranged respectively on each of the two parts 18a, 18b. The main cutting edges 12a-12d of each part 18a, 18b run parallel to one another, but transversely or in a skewed manner to the main cutting edges 12a-12d of the respectively other part 18a, 18b. Each part 18a, 18b comprises two identical, oppositely arranged part main sides on which the main cutters 12a-12d are arranged, and two identical part secondary sides which run transversely thereto and are also arranged opposite one another.

On account of the afore-described arrangement of the two parts 18a, 18b relative to one another, each main side 16a-16d of the cutting insert 10 comprises a part main side of a part 18a, 18b and a part secondary side of the correspondingly other part 18a, 18b. The first main side 16a of the cutting insert 10 comprises, for example, a part main side of the first part 18a, on which the first main cutting edge 12a is arranged, and a part secondary side of the second part 18b arranged below it. The second main side 16b of the cutting insert 10 comprises, in contrast, a part secondary side of the first part 18a and a part main side of the second part 18b arranged below it, on which the second main cutting edge 12b is arranged. The third main side 16c of the cutting insert 10 comprises a part main side of the first part 18a, on which the third main cutting edge 12c is arranged, and a part secondary side of the second part 18b arranged below it. The fourth main side 16d of the cutting insert 10 comprises a part secondary side of the first part 18a and a part main side of the second part 18b arranged below it on which the fourth main cutting edge 12d is arranged.

On account of the four identical main sides 16a-16d and the already mentioned symmetry characteristics of the cutting insert 10, the cutting insert 10 can be used in four different positions in the tool holder without changing the cutting geometry or the cutting characteristics. For example, the first main cutter 12a could be used first of all for machining. As soon as it is worn, the cutting insert 10 can be rotated by 180° about the bore axis 20 so that the main cutter 12c is then used. In order then to allow the two main cutters 12b and 12c to be used, the cutting insert must be turned just 180° and fastened again to the tool holder in the corresponding manner.

In the fastened state, the cutting insert 10 rests in a planar manner on the tool holder either by way of a planar support surface 24a which is provided on the first base side 14a or by way of a second support surface 24b which is provided on the oppositely arranged, second base side 14b. The two support surfaces 24a, 24b run parallel to one another and orthogonally to the bore axis 20. Both support surfaces 24a, 24b are at the identical distance from the imaginary center plane 11.

Along with each main cutting edge 12a-12d, each main side 16a-16d of the cutting insert 10 additionally comprises a secondary cutting edge 26a-26d. The cutting insert 10 therefore comprises a total of four secondary cutting edges 26a-26d. Similar to the main cutting edges 12a-12d, the secondary cutting edges 26a-26d are also rectilinear or non-curved cutting edges. They preferably run parallel to one another. Preferably, the secondary cutting edges 26a-26d are aligned orthogonally to the main cutting edges 12a-12d or parallel to the bore axis 20. Each of the two parts 18a, 18b of the cutting insert 10 consequently comprises two main cutting edges 12a-12d and two secondary cutting edges 26a-26d, respectively.

The four main cutting edges 12a-12d are arranged in a common imaginary cutting plane in each case with the secondary cutting edge 26a-26d arranged on the same main side 16a-16d. Consequently, a total of four of said imaginary cutting planes exist, of which two in each case are aligned parallel to one another. The four imaginary cutting planes are, however, all aligned orthogonally to the imaginary center plane 11 and to the two support surfaces 24a, 24b. Each main side 16a-16d of the cutting insert 10 additionally comprises a planar contact surface 28a-28d, offset somewhat inward in relation to said imaginary cutting planes, that is to say toward the central bore axis 20. Each of the previously described, imaginary cutting planes run parallel to the contact surface 28a-28d arranged in each case on the same main side 16a-16d so that, therefore, the main and secondary cutting edges 12a-12d and 26a-26d of each main side 16a-16d run in each case parallel to the contact surface 28a-28d arranged on same main side 16a-16d.

In the state installed into the tool holder, the cutting insert 10 abuts against the tool holder preferably by way of two of the contact surfaces 28a-28d and rests in a planar manner on the tool holder by way of one of the two support surfaces 24a, 24b.

On account of the respectively greater distance of the cutting planes from the bore axis 20 compared to the contact surfaces 28a-28d, there is on each main side 16a-16d of the cutting insert 10 a type of chip groove which is produced between the main cutting edges 12a-12d arranged on the respectively same main side 16a-16d, the corresponding secondary cutting edge 26a-26d and the corresponding contact surface 28a-28d. Each of said chip grooves is closed on a side of the respective main cutting edge 12a-12d (on the right-hand side of the main cutting edge 12c in FIG. 3 and on the left-hand side of the main cutting edge 12d in FIG. 4) and is open on the oppositely arranged side of the respective main cutting edge 12a-12d (on the left-hand side of the main cutting edge 12c in FIG. 3 and on the right-hand side of the main cutting edge 12d in FIG. 4). When the cutting insert is in use, the main part of the chip formation is typically created on the side on which the described chip groove comprises in each case a closed contour, whereas a large part of the formed chip flows away toward the outside on the side on which the chip groove comprises an open contour.

Each of the four main cutting edges 12a-12d is connected to one of the four secondary cutting edges 26a-26d on the "closed" side in each case via a first corner edge 30a-30d. In the present exemplary embodiment shown, said first corner edge 30a-30d is in each case a combination of a radius 32a-32d and a chamfer 34a-34d connecting thereto. As an alternative to this, the first corner edge 30a-30d can also be designed in each case only by a radius or only by a chamfer.

The first corner edges 30a-30d are also arranged irrespectively of this in the afore-described, respective cutting planes in which the main and secondary cutting edges 12a-12d and 26a-26d arranged on the respectively identical main side 16a-16d are also arranged.

A side edge 36a-36d, which is not used as a cutting edge and accordingly does not have to be ground, is preferably arranged on the oppositely arranged "open" side of each main cutting edge 12a-12d in place of a secondary cutting edge. The side edges 36a-36c are preferably realized as rectilinear or non-curved edges. The side edges 36a-36c can be connected to the respective main side edge 12a-12d either directly or via a radius and/or chamfer. In the present exemplary embodiment, the side edges 36a-36d are connected to the respective main cutting edge 12a-12d via a second corner edge 38a-38d which comprises both a radius 40a-40d and a chamfer 42a-42d.

The side edges 36a-36d are connected to a second corner edge 38a-38d in each case by way of their respective first ends. On their respectively oppositely arranged second ends, the side edges 36a-36d abut in each case preferably directly against the contact surface 28a-28d arranged on the same main side 16a-16d. Proceeding from the second corner edges 38a-38d, the side edges 36a-36d therefore run away to the rear, as it were, as a result of which the above-described "open" side of the chip groove contour is created.

A planar chip surface 44a-44d is arranged between each main cutting edge 12a-12d and the contact surface 28a-28d arranged on the same main side 16a-16d. An at least partially circumferential chamfer, which extends continuously along the second corner edge 38a-38d arranged on the respective main side 16a-16d, the main cutting edge 12a-12d, the first corner edge 30a-30d as well as along the secondary cutting edge 26a-26d and abuts against the respectively adjacent chip surface 44a-44d, is provided additionally on each main side 16a-16d. Said partially circumferential chamfer 46a-46d serves as a protective chamfer for the cutting edges.

In addition, it can be seen from the drawings that in each case a first projection 48a-48d and a second projection 50a-50d, which jut out in relation to the contact surfaces 28a-28d, are arranged on each main side 16a-16d.

One of the four first corner edges 30a-30d and one of the four secondary cutting edges 26a-26d is arranged on each of the four first projections 48a-48d, namely in each case one corner edge 30a-30d and secondary cutting edge 26a-26d of an adjacent main side 16a-16d.

One of the four second corner edges 38a-38d and one of the four side edges 36a-36d is arranged on each of the four second projections 50a-50d, namely in each case one corner edge 38a-38d and one side edge 36a-36d of an adjacent main side 16a-16d.

The first and second projections 48a-48d and 50a-50d are arranged in each case on the part secondary sides. The free angles of the secondary cutting edges 26a-26d are formed into the first projections 48a-48d.

According to the embodiment shown in the figures, the contact surfaces 28a-28d are in each case divided by an indentation 52a-52d into two part surfaces 54a-54d and 56a-56d. Said division of the contact surfaces 28a-28d improves the insert seat as a type of two-point contact or two-plane contact is created as a result.

According to the embodiment shown, markings which identify or number the respective main side 16a-16d of the cutting insert 10 are provided inside the indentations 52a-52d.

Figure 6:
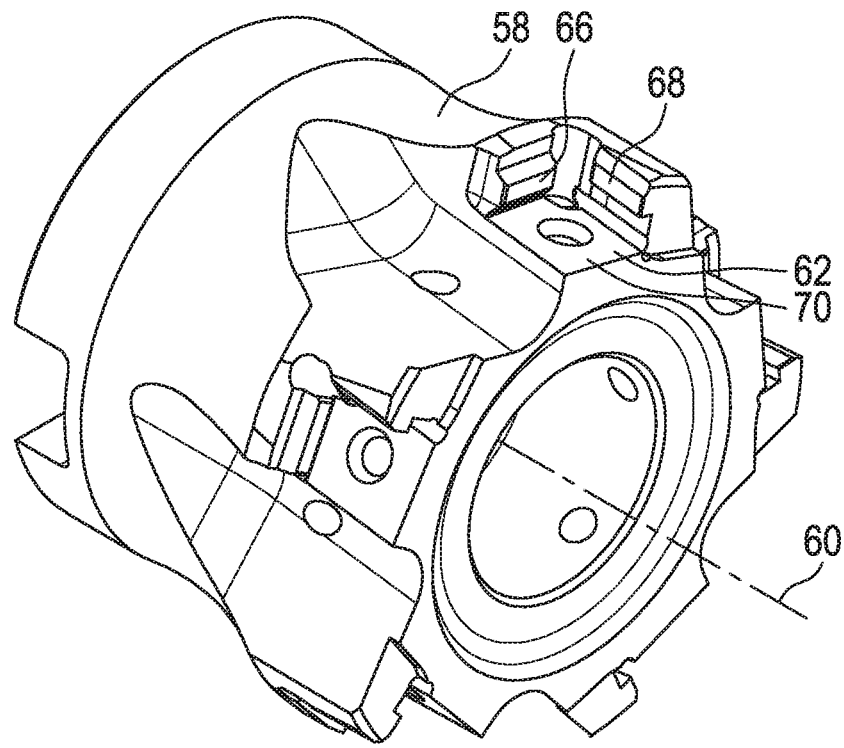
FIG. 6 shows a perspective view of a tool holder as an example in which the cutting insert can be used.
Figure 7:
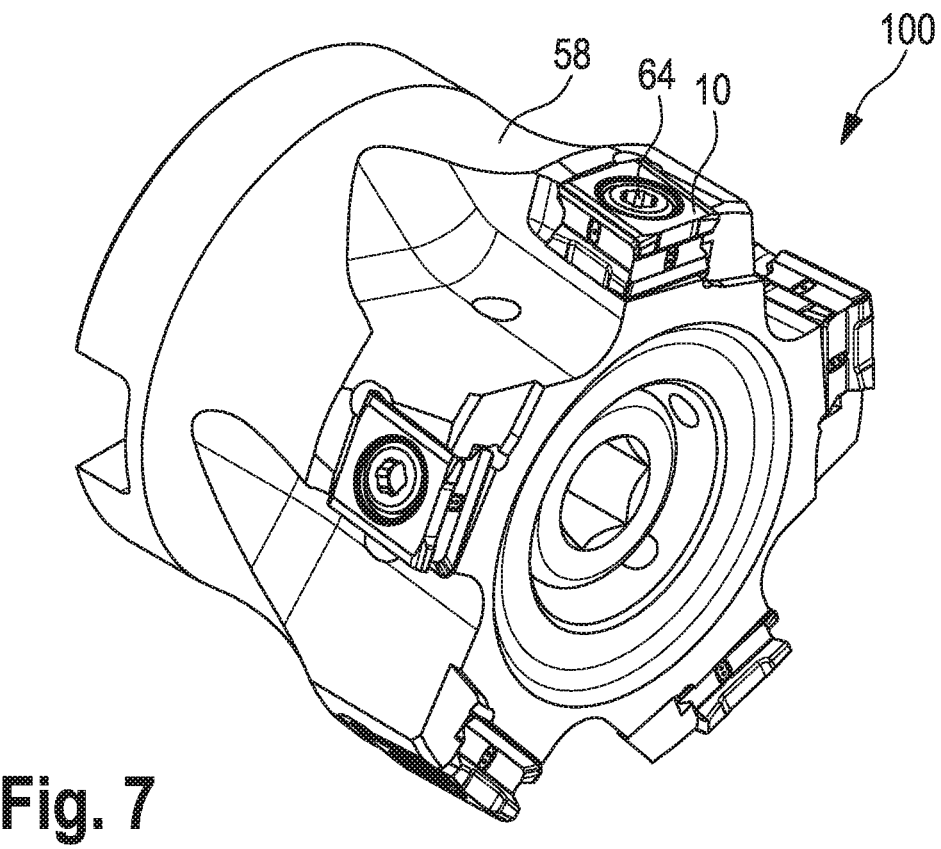
FIG. 7 shows a perspective view of the tool holder shown in FIG. 6 together with the cutting inserts inserted therein.
Figure 8:
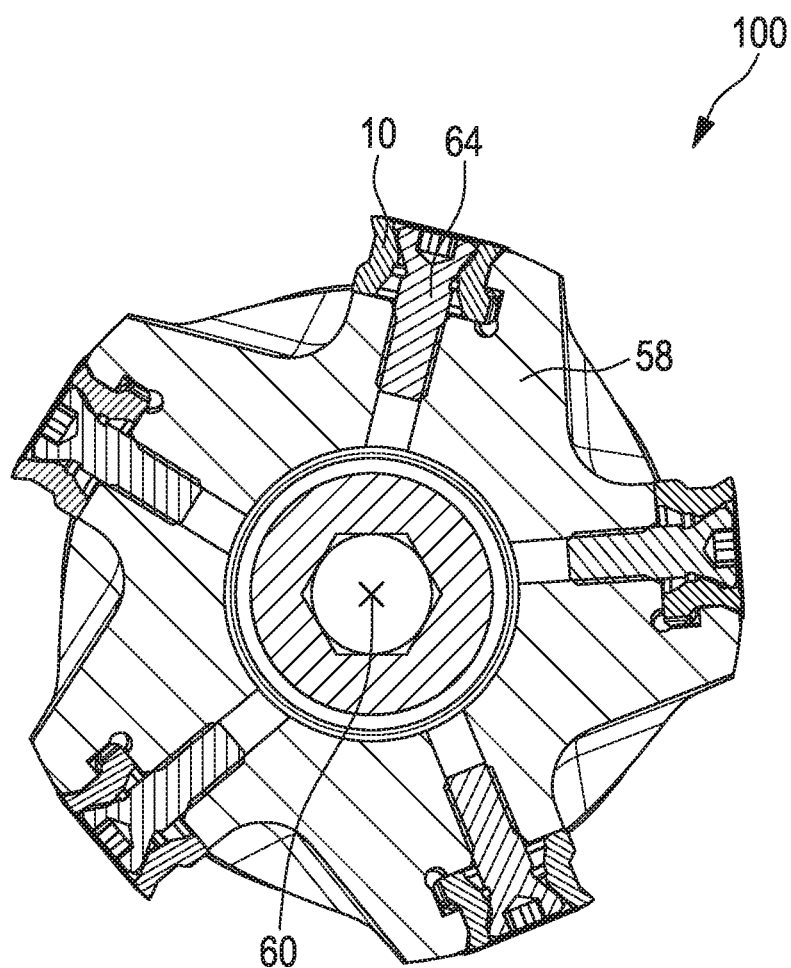
FIG. 8 shows a sectional view of the tool holder shown in FIG. 7 with cutting inserts inserted therein.

FIGS. 6-8 show a tool, as an example, in which the cutting insert 10 is typically used. The tool is designated overall by way of the reference numeral 100.

The tool, shown as an example, is a tangential milling tool in the present case. Said tool 100 comprises a tool holder 58 which is rotationally symmetrical to a rotational axis 60. At least one, preferably a plurality of, cutting insert receptacle 62, which function as receptacle for one cutting insert 10 in each case, are provided circumferentially on the tool holder 58. Each of the cutting inserts 10 is fastened releasably to the tool holder 58 by way of a screw 64.

The structural details of a cutting insert receptacle 62 can be seen in FIG. 6. The cutting insert receptacle 62 comprises in each case two contact surfaces 66, 68 and one support surface 70, against which the cutting insert 10 abuts and on which it rests. The cutting insert 10 therefore abuts by way of one of its contact surfaces 28a-28d in each case against the contact surface 66 of the tool holder, by way of a further contact surface 28a-28d in each case against the contact surface 68 of the tool holder, and rests by way of one of its two support surfaces 24a, 24b on the support surface 70 of the tool holder 58.

What is claimed is:

1. A cutting insert for a tool for machining a workpiece, comprising:
 two identical parts, a first part and a second part;
 a through-bore which runs through both parts along a bore axis;
 two identical, oppositely arranged base sides, a first base side which is part of the first part and comprises a first planar support surface which runs orthogonally to the bore axis, and a second base side which is part of the second part and comprises a second planar support surface which runs orthogonally to the bore axis;
 four identical main sides which extend between the two base sides, wherein each of the four main sides comprises a planar contact surface which runs orthogonally to the first and the second support surface;
 precisely four rectilinear main cutting edges, wherein precisely one of the four main cutting edges is arranged on each of the four main sides, respectively, and each of the two parts comprises two of the four main cutting edges, respectively, wherein the two main cutting edges of the first part run parallel to one another, and wherein the two main cutting edges of the second part run parallel to one another and at an acute angle to the main cutting edges of the first part;

precisely four rectilinear secondary cutting edges, wherein precisely one of the four secondary cutting edges is arranged on each of the four main sides, respectively, and each of the two parts comprises two of the four secondary cutting edges, respectively, and wherein the secondary cutting edges run transversely to the main cutting edges;

wherein the two parts are connected together along a center plane which runs orthogonally to the bore axis and at an identical distance from the first support surface and the second support surface, respectively, and wherein the first part is projected onto the second part as a result of rotation by 180° about a rotational axis lying in the center plane and a subsequent rotation by the acute angle about the bore axis; wherein each of the four main cutting edges is connected at a first end to one of the four secondary cutting edges, which is arranged on the respective same main side, via a first corner edge, which comprises a radius and/or a chamfer, and wherein each of the four main cutting edges is arranged with the secondary cutting edge, arranged on the respective same main side, in a common cutting plane which is aligned parallel to the contact surface arranged on the respective same main side, wherein each of the contact surfaces is offset toward the central bore axis in relation to the cutting plane arranged on the respective same main side.

2. The cutting insert as claimed in claim 1, wherein each of the four main cutting edges is connected in each case at a second end to a side edge either directly or via a second corner edge which comprises a radius and/or a chamfer, wherein each of the four side edges is not arranged in the respective cutting plane in which the main cutting edge and secondary cutting edge of the respective same main side are arranged.

3. The cutting insert as claimed in claim 2, wherein a first end of each side edge is connected either directly or via the corresponding second corner edge to the main cutting edge arranged on the same main side, and wherein a second end of each side edge is connected directly, via a radius or via a chamfer to an edge of the contact surface arranged on the same main side, and wherein the four contact surfaces are at a shorter distance from the bore axis than the four cutting planes.

4. The cutting insert as claimed in claim 1, wherein a planar chip surface is arranged between each main cutting edge and the contact surface arranged in each case on the same main side.

5. The cutting insert as claimed in claim 4, wherein each of the four main cutting edges is connected in each case at a second end to a side edge either directly or via a second corner edge which comprises a radius and/or a chamfer, wherein each of the four side edges is not arranged in the respective cutting plane in which the main cutting edge and secondary cutting edge of the respective same main side are arranged, wherein an at least partially circumferential chamfer, which extends continuously along the second corner edge, arranged on the respective main side, the main cutting edge, the first corner edge and the secondary cutting edge and abuts against the chip surface arranged on the same main side, is arranged on each main side.

6. The cutting insert as claimed in claim 1, wherein the center plane intersects all four contact surfaces so that part of each contact surface is associated with the first part and another part of each contact surface is associated with the second part.

7. The cutting insert as claimed in claim 1, wherein each of the four contact surfaces comprises two planar part surfaces, respectively, which are separated from one another by an indentation.

8. The cutting insert as claimed in claim 1, wherein each main side comprises two projections, respectively, on which the secondary cutting edges of the adjacent main sides are arranged, wherein the projections are arranged on oppositely arranged sides of the respective main side and protrude in relation to the contact surface of the respective main side.

9. The cutting insert as claimed in claim 1, wherein the four secondary cutting edges run parallel to one another and orthogonally to the main cutting edges.

10. The cutting insert as claimed in claim 1, wherein each of the main sides and each of the contact surfaces are asymmetrical.

11. The cutting insert as claimed in claim 1, wherein, when viewed in plan view along the bore axis, the cutting insert has a form of a rhomboid.

12. The cutting insert as claimed in claim 1, wherein the main cutting edges are at a smaller distance from the center plane than the support surfaces.

13. A tool for machining a workpiece, having a tool holder which comprises at least one cutting insert receptacle in which a cutting insert is releasably fastened, the cutting insert comprising:

two identical parts, a first part and a second part;

a through-bore which runs through both parts along a bore axis;

two identical, oppositely arranged base sides, a first base side which is part of the first part and comprises a first planar support surface which runs orthogonally to the bore axis, and a second base side which is part of the second part and comprises a second planar support surface which runs orthogonally to the bore axis;

four identical main sides which extend between the two base sides, wherein each of the four main sides comprises a planar contact surface which runs orthogonally to the first and the second support surface;

precisely four rectilinear main cutting edges, wherein precisely one of the four main cutting edges is arranged on each of the four main sides, respectively, and each of the two parts comprises two of the four main cutting edges, respectively, wherein the two main cutting edges of the first part run parallel to one another, and wherein the two main cutting edges of the second part run parallel to one another and at an acute angle to the main cutting edges of the first part;

precisely four rectilinear secondary cutting edges, wherein precisely one of the four secondary cutting edges is arranged on each of the four main sides, respectively, and each of the two parts comprises two of the four secondary cutting edges, respectively, and wherein the secondary cutting edges run transversely to the main cutting edges;

wherein the two parts are connected together along a center plane which runs orthogonally to the bore axis and at an identical distance from the first support surface and the second support surface, respectively, and wherein the first part is projected onto the second part as a result of rotation by 180° about a rotational axis lying in the center plane and a subsequent rotation by the acute angle about the bore axis; wherein each of the four main cutting edges is connected at a first end to one of the four secondary cutting edges, which is arranged on the respective same main side, via a first corner edge, which comprises a radius and/or a chamfer, and wherein each of the four main cutting edges is arranged with the secondary cutting edge, arranged on the respective same main side, in a common cutting plane which is aligned parallel to the contact surface arranged on the respective same main side, wherein each of the contact surfaces is offset toward the central bore axis in relation to the cutting plane arranged on the respective same main side.

* * * * *